United States Patent [19]

Bates

[11] Patent Number: 5,676,229

[45] Date of Patent: Oct. 14, 1997

[54] CONTROL METHOD/SYSTEM FOR PNEUMATICALLY ACTUATED CLUTCH

[75] Inventor: Ian Richard Joseph Bates, Huddersfield, England

[73] Assignee: Eaton Corporation, Cleveland, Ohio

[21] Appl. No.: 600,570

[22] Filed: Feb. 13, 1996

[30] Foreign Application Priority Data

Feb. 18, 1995 [GB] United Kingdom ............... 9503219

[51] Int. Cl.$^6$ ............... F16D 48/06; F16D 25/12
[52] U.S. Cl. ............... 192/85 R; 192/109 R; 192/109 F
[58] Field of Search ............... 192/85 R, 109 R, 192/109 F, 85 C, 91 R, 111 A

[56] References Cited

U.S. PATENT DOCUMENTS

| | | |
|---|---|---|
| 4,081,065 | 3/1978 | Smyth et al. . |
| 4,361,060 | 11/1982 | Smyth . |
| 4,629,045 | 12/1986 | Kasai et al. . |
| 4,860,868 | 8/1989 | Murakami ............... 192/85 R |
| 4,899,858 | 2/1990 | Cote et al. ............... 192/111 A X |
| 4,926,994 | 5/1990 | Koshizawa et al. ............... 192/85 C X |
| 5,029,678 | 7/1991 | Koshizawa ............... 192/111 A X |
| 5,042,631 | 8/1991 | Ellenberger et al. ............... 192/109 F X |
| 5,065,851 | 11/1991 | Otsuka et al. ............... 192/111 A X |
| 5,105,922 | 4/1992 | Yant ............... 192/85 R X |
| 5,275,267 | 1/1994 | Slicker . |
| 5,337,874 | 8/1994 | Oltean et al. ............... 192/111 A |
| 5,390,497 | 2/1995 | Cottam ............... 192/85 R X |

FOREIGN PATENT DOCUMENTS

| | | |
|---|---|---|
| 0453749 | 3/1991 | Germany . |
| 2153035 | 8/1985 | United Kingdom . |

*Primary Examiner*—Rodney H. Bonck
*Attorney, Agent, or Firm*—Howard D. Gordon

[57] ABSTRACT

A control method/system for controlling the operation of a pneumatically actuated vehicular master clutch (20) is provided. A position sensor (76) senses the position of an actuating piston (82) in a cylinder (80), and the piston is controlled to move to and remain at an axial position (DOP, EOP) offset stop members (88, 90) in at least one of the fully disengaged and engaged positions of the clutch.

20 Claims, 4 Drawing Sheets

CONTROL METHOD/SYSTEM FOR PNEUMATICALLY ACTUATED CLUTCH

BACKGROUND OF THE INVENTION

RELATED APPLICATIONS

This application claims priority from GB 9503219.9, filed Feb. 18, 1995.

1. Field of the Invention

The present invention relates to a control method/system for a vehicular master friction clutch and, in particular, to a control method/system for automatically controlling a pneumatically actuated vehicular master friction clutch.

2. Description of the Prior Art

Control systems and methods for controlling vehicular master friction clutches, and vehicular automated mechanical transmission systems utilizing automatically controlled master friction clutches, are known in the prior art, as may be seen by reference to U.S. Pat. Nos. 4,081,065; 4,361,060; 4,595,986; 4,648,290; 4,712,658; 5,275,267; 5,377,979 and 5,337,874, the disclosures of which are incorporated herein by reference.

The prior art controls for pneumatically actuated master clutches were not totally satisfactory, as the clutch actuator piston typically was pinned against stop members in the fully engaged and/or fully disengaged position thereof, which, due to the compressibility of pneumatic gas, often resulted in excessively high or low pressurizations in the actuating cylinder, which required a period of time to overcome when causing the piston to be moved to a different position and, thus, decreased the responsiveness of the actuator.

SUMMARY OF THE INVENTION

In accordance with the present invention, the drawbacks of the prior art have been minimized or overcome by the provision of a control method/system for a pneumatically actuated vehicular master friction clutch actuator of the type having a piston movable in a cylinder in a first direction to engage the clutch and in a second direction to disengage the clutch, travel in both directions limited by stop members with increased responsiveness as compared to similar prior art controls. The foregoing is accomplished by providing an actuator piston position sensor, by determining actuator piston position(s) corresponding to engagement with a stop and then, when causing the actuator piston to fully engage or fully disengage the master clutch, commanding the position to assume and maintain (preferably by a closed-loop-type control) a position offset by a minimal amount the piston associated with engaging the stop member. Alternatively, the piston may be moved to the stop-engaging position thereof and then backed off to and maintained at the minimally offset position thereof. Thereafter, when a change in clutch condition is required, the actuator need not relieve excess pressure, or build up from inadequate pressure, prior to causing the piston to move in the desired direction, thereby improving responsiveness of the control.

Accordingly, it is an object of the present invention to provide a more responsive control for pneumatically actuated vehicular master friction clutches.

This and other objects and advantages of the present invention will become apparent from a reading of the detailed disclosure of the preferred embodiment(s) taken in connection with the drawings.

BRIEF DESCRIPTION OF THE DRAWINGS

FIG. 2A is an enlarged sectional view of a portion of FIG. 2 illustrating an actuator piston position in accordance with the present invention.

DESCRIPTION OF THE PREFERRED EMBODIMENT

Figure 1:
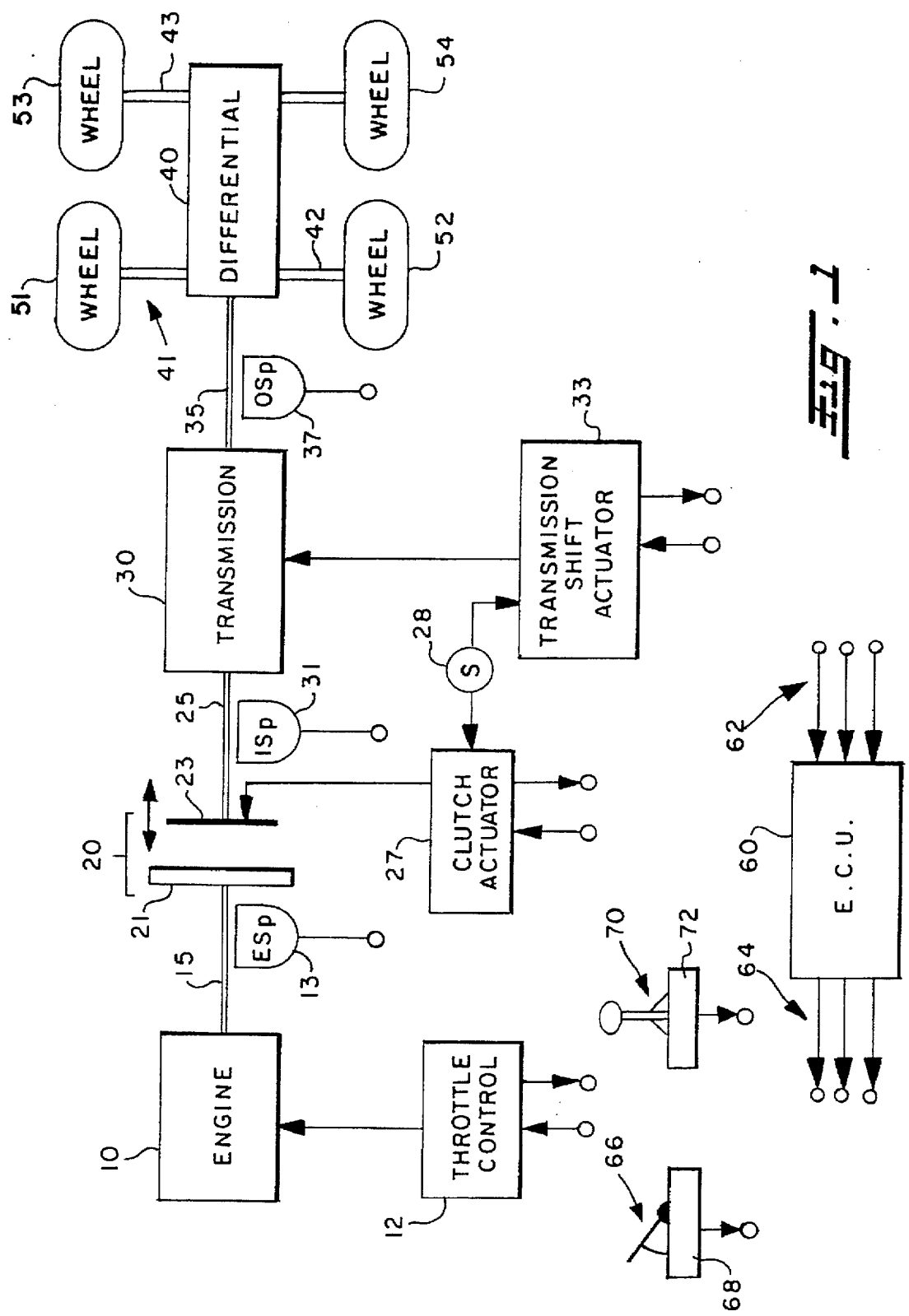
FIG. 1 is a schematic illustration of a vehicular automated transmission system having an automated master friction clutch of the type advantageously utilizing the control method/system of the present invention.

The drivetrain of a heavy-duty motor vehicle, such as a heavy-duty truck or the like, including the automatic clutch control of the present invention, is illustrated in schematic form in FIG. 1. The typical drivetrain includes a fuel-throttle-controlled engine, such as a diesel engine or the like, and a throttle control 12 for controlling the fueling thereof. Engine 10 provides torque on a crankshaft or output shaft 15, the rotational speed of which is sensed by an engine speed sensor 13.

The vehicular master friction clutch 20 includes a fixed plate 21 driven by the engine output shaft 15 and a movable plate 23 that is axially movable relative to fixed plate 21 into full or partial engagement thereof. While FIG. 1 illustrates only a single pair of fixed and movable plates, those skilled in the art will realize that clutch 20 may include multiple pairs of such plates. A clutch actuator assembly is provided and is associated with the movable plate 23 for control of clutch 20 from disengagement to partial engagement to full engagement. As illustrated, clutch actuator is pneumatically actuated and is provided with pressurized gas, such as regulated filtered air, from a source 28. Source 28 may be the onboard air compressor of a heavy-duty truck, which also will provide actuating fluid to the vehicle brake system and to various other actuators, such as a transmission actuator or the like.

As illustrated, movable plate 23 of master friction clutch 20 is rotatably attached to the input shaft 25 of multiple-speed transmission 30. The rotational speed of input shaft 25 is sensed by an input shaft speed sensor 31.

Transmission 30 is preferably a mulitple-speed mechanical-type transmission of the type illustrated in U.S. Pat. Nos. 4,735,109 or 4,754,665, the disclosures of which are incorporated herein by reference. A transmission shift actuator 33 is provided for controlling the shifting of transmission 30 and may be of any known type, such as the "X-Y" type illustrated in U.S. Pat. Nos. 4,873,881 and 4,899,607, the disclosures of which are incorporated herein by reference. The output of transmission 30 is output shaft 35, the rotational speed of which is sensed by an output shaft speed sensor 37. Output shaft 35 may be drivingly connected to an interaxle differential 40 for driving a tandem drive axle assembly 41 comprising a forward drive axle 42 and rearward drive axle 43 to drive wheels 51, 52, 53 and 54, as illustrated. Tandem drive axle assemblies of this type are well known in the prior art, as may be seen by reference to U.S. Pat. No. 4,050,534, the disclosure of which is incorporated herein by reference.

A microprocessor-based control unit, ECU 60, is provided for receiving various input signals 62 and for processing same according to predetermined logic rules to issue command output signals 64 to various system actuators or controllers, such as the throttle control 12, the clutch actuator 27 and the transmission shift actuator 33. The input signals received by ECU 60 typically will include the rotational speed signals from engine speed sensor 13, input shaft speed sensor 31 and output shaft speed sensor 37, as well as feedback signals from the throttle control 12, the clutch actuator 27 and the transmission shift actuator 33. In addition, the position of the manually controlled throttle pedal 66 is sensed by a throttle position sensor 68, and the position of a shift selector lever 70 is sensed by a shift selector sensor 72, both of which provide input signals to ECU 60. ECU 60 may be of the type illustrated in aforementioned U.S. Pat. No. 4,595,986.

The ECU 60 may control and/or communicate with an engine ECU by means of an electronic data link of the type conforming to SAE J1922, SAE J1936, ISO 11898 or similar protocol.

Figure 2:
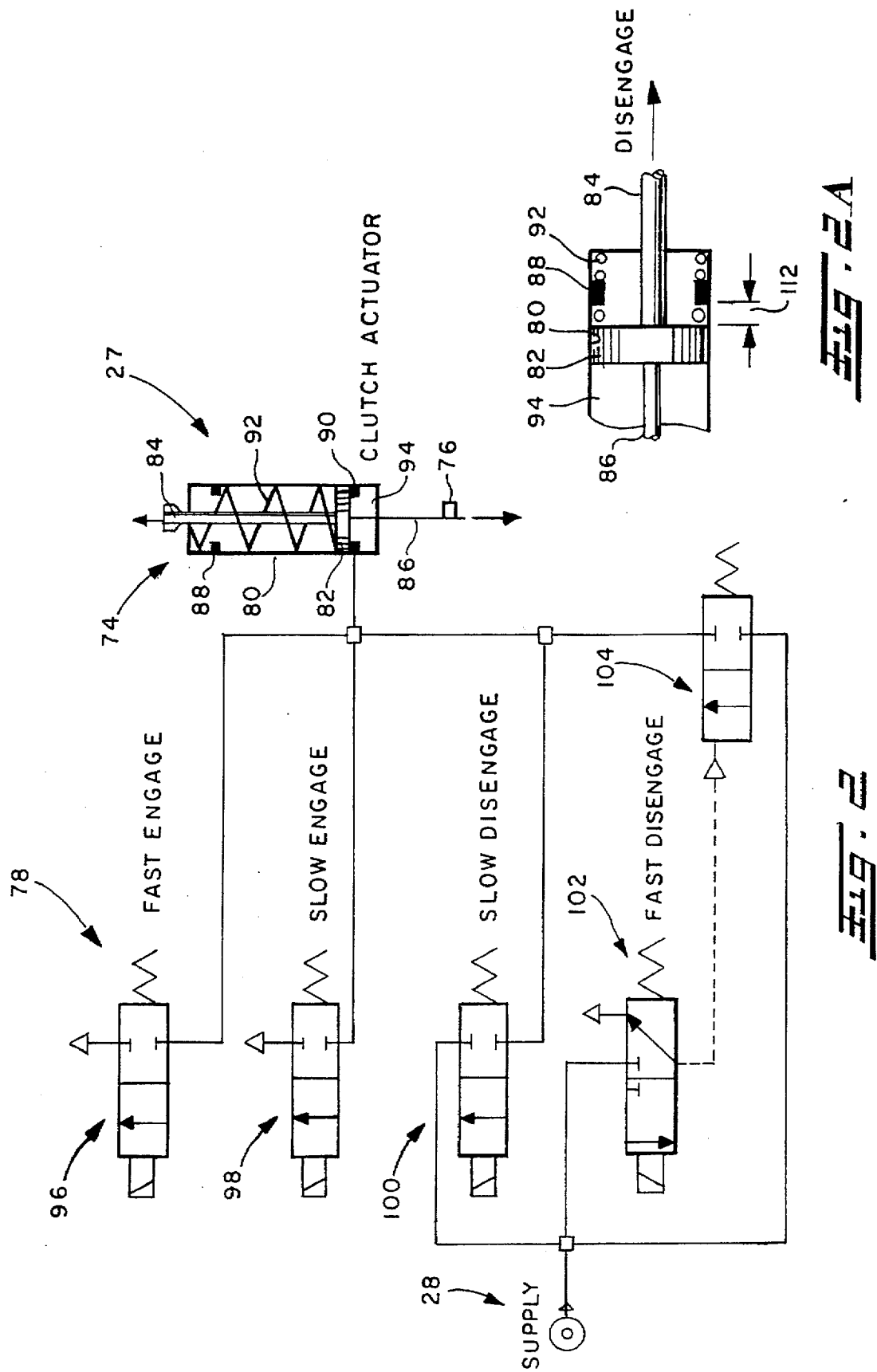
FIG. 2 is a schematic illustration of a pneumatic actuator for a master friction clutch of the type advantageously utilizing the control of the present invention.

A pneumatically operated clutch actuator assembly 27 for controlling the engagement and disengagement of master friction clutch 20 is schematically illustrated in FIG. 2. The actuator assembly 27 includes an actuator piston and cylinder subassembly 74, an actuator piston position sensor 76 and a valving subassembly 78 for controlling operation of the piston and cylinder subassembly 74.

The actuator piston and cylinder subassembly 74 includes a cylinder 80 and an actuator piston 82 slidably and sealingly received therein. Actuator piston 82 carries a piston rod 84 which is connected to the clutch release mechanism, and a second rod member 86, which is axially fixed thereto and cooperates with position sensor 76. A stop member 88 is provided to limit movement of the piston 82 in the clutch release direction, and a stop member 90 is provided to limit piston movement in the engaged direction, relative to cylinder 80. Piston 82 is constantly biased in the engaged direction by a resilient compression spring 92 and, along with cylinder 80, defines a selectively pressurizible and exhaustible chamber 94, the pressurization of which is effective to cause the piston 82 to move in the clutch release mechanism in opposition to the bias of compression spring 92. Pressurization and exhaust of chamber 94 is controlled by the valve assembly 78, which is connected to the source of pneumatic fluid 28.

Valve assembly 78 includes a two-way, two-position, solenoid-controlled, fast-engage valve 96 and a two-way, two-position, solenoid-controlled, slow-engage valve 98, both of which are normally closed and both of which, in the open position, are effective to exhaust chamber 94, allowing spring 92 to bias the actuator piston in the engaged position thereof. Valve assembly 78 further includes the normally closed two-way, two-position, solenoid-controlled slow-disengage valve 100, connected to the source 28 for pressurizing chamber 94 when open. Valve assembly 78 also includes a three-way, two-position, solenoid-controlled, fast-disengage valve 102, which is biased to a normally vented position and which is effective, when moved to the open position, to open a two-way, two-position, normally closed, fast-disengage valve 104 for quickly pressurizing chamber 94.

As actuator piston 82 is a differential area piston, the source of pressurized air or other actuating gas 28 could be constantly connected to the chamber in which spring 92 resides, and spring 92 could be eliminated. Further, stop members 92 and 88 may be external of and/or remote from cylinder 80. Position sensor 76 also may be internal of cylinder 80 and/or remote therefrom and may be of any known structure.

Figure 3:
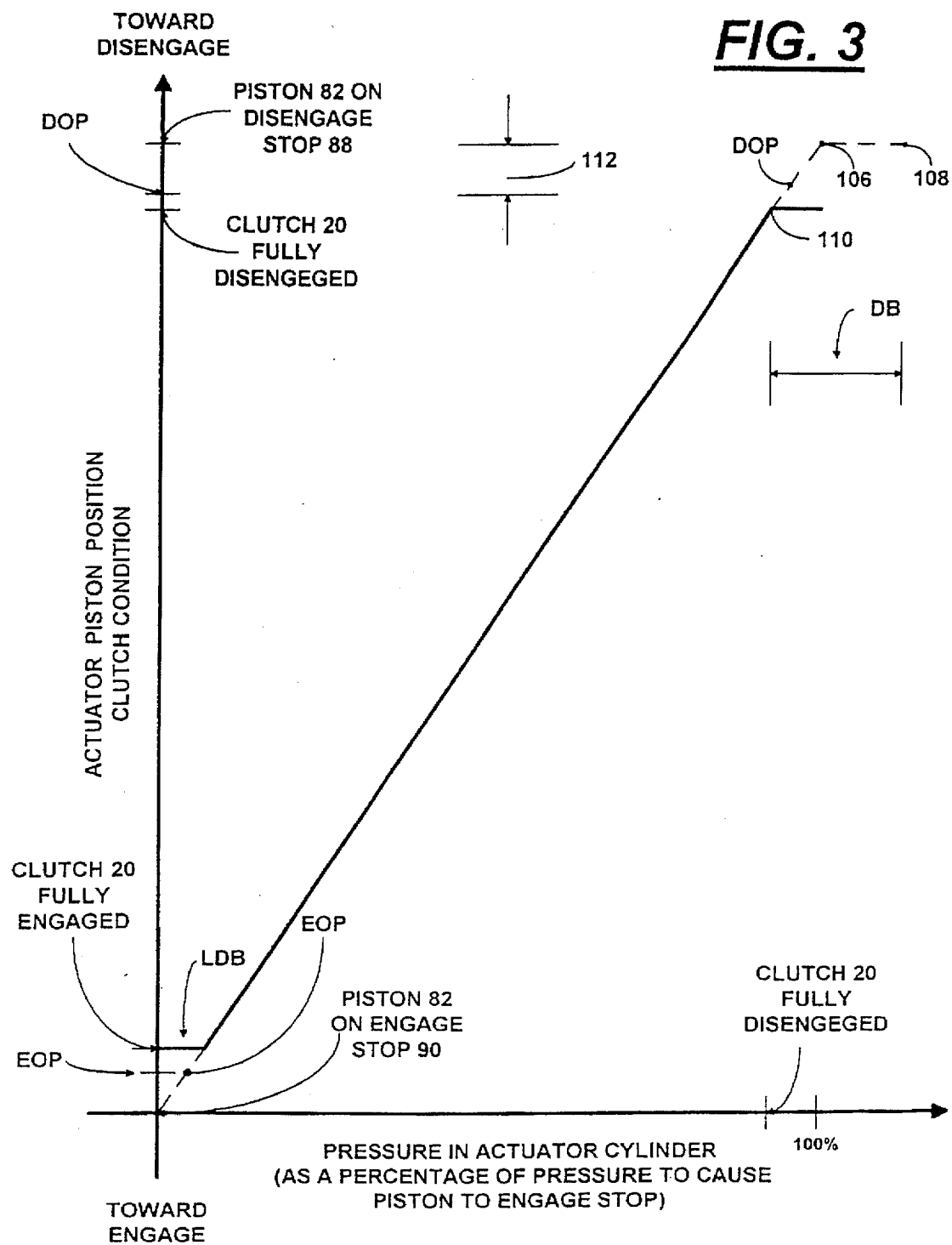
FIG. 3 is a graphical representation of the operation of the actuator of FIG. 2.

The operational characteristics of clutch 20 and clutch actuator assembly 27 are graphically illustrated in FIG. 3. For purposes of illustration only, it is assumed that the displacement of actuator piston 82 in cylinder 80 is linear with changes in pressure in chamber 94 and that the movement of movable clutch plate 23 relative to fixed clutch plate 21 is linear with axial movements of actuator piston 82. In FIG. 3, the condition of clutch 20 is illustrated in a solid line, while the position of the actuator piston 82 is illustrated in a dashed line.

As may be seen by reference to FIG. 3, clutch 20 will become fully disengaged prior to piston 82 bottoming out on the disengaged stop 88, and clutch 20 will become fully engaged prior to the actuator piston 82 bottoming out on the engaged stop 90. If, for example, when fully disengaging clutch 20, the actuator piston 82 is caused to engage and remain engaged with disengaged stop 88 (as seen at point 106), pressure in the actuator cylinder will continue to build (such as to point 108). Thereafter, if it is desired to begin engagement of clutch 20, it is necessary to relieve pressure in cylinder chamber 94 from point 108 to point 110 prior to clutch 20 actually beginning to disengage. The pressure release from point 108 to point 110, thus, is a dead band, DB, for control purposes, requires a certain amount of time to accomplish, and provides a degree of unresponsiveness of the clutch actuator 27 to the command output signals from ECU 60. A similar situation occurs when allowing actuator piston 82 to engage and remain on the engaged position stop 90 when retaining the clutch 20 in the fully engaged position thereof.

According to the clutch control method/system for a pneumatically actuated vehicular master clutch of the present invention, the dead band (DB) associated with the fully engaged and disengaged clutch actuator piston positions are minimized to provide increased responsiveness of the pneumatic clutch actuator 27. To accomplish this, actuator piston positions corresponding to piston engagement with the two stop members, disengage stop 88 and engage stop 90, are learned and memorized. By way of example, in a calibration routine, the chamber 94 may be fully evacuated for a period of time to sense the piston position corresponding to engagement of the engage stop 90, and then the chamber 94 may be pressurized for a given period of time, and then the piston position corresponding to engagement with the disengage stop 88 may be sensed and memorized. Thereafter, when commanding disengagement of clutch 20, the actuator piston 82 will be commanded to assume a position, referred to as the disengage offset position (DOP in FIG. 3), which is offset from the position at which disengage stop 88 would be contacted by a predetermined offset amount (shown as 112 in FIG. 3) selected so that clutch 20 remains fully disengaged. By causing actuator piston 82 to assume and maintain this position, the width of the dead band (DB in FIG. 3) is reduced and, thus, the responsiveness of the clutch actuator 27 is increased.

Similarly (see FIG. 3), when causing clutch 20 to be fully engaged, the actuator piston 22 is maintained in a position offset from engagement with stop 90 by a predetermined offset amount to the EOP (engage offset position) achieve a similar result in increased responsiveness of the clutch actuator 27.

The offset position DOP of piston 82 in cylinder 80 is illustrated, in exaggerated manner for purposes of illustration, in FIG. 2B.

In an alternate embodiment of the present invention, when causing clutch 20 to assume the fully disengaged position thereof, piston 82 may be caused to move in the disengaged position until stop 88 is contacted, and then, after contact with stop 88, the piston 82 will be caused to move a small distance, the offset amount 112, in the engaged direction to the disengage offset position.

Figure 4:
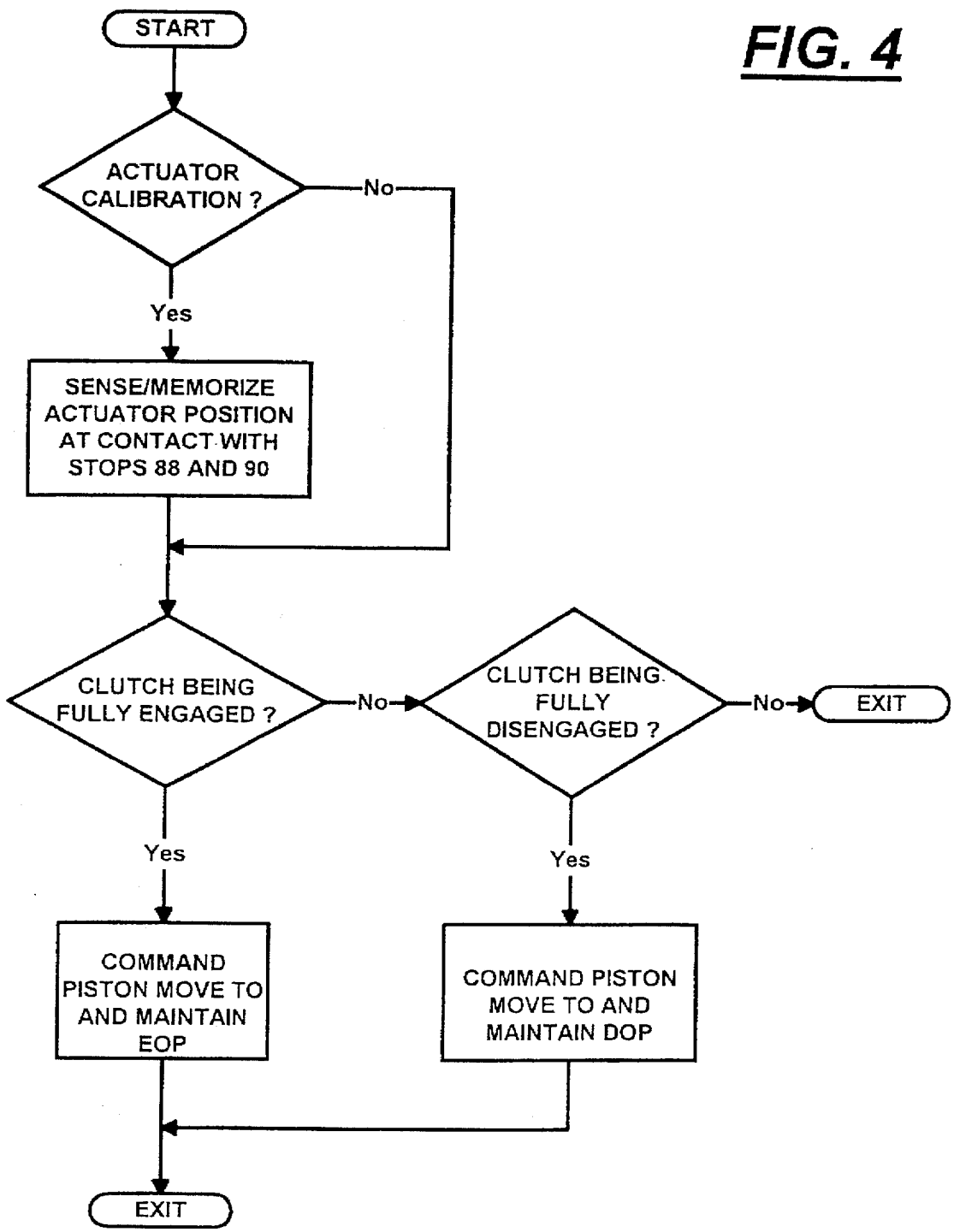
FIG. 4 is a schematic representation, in flow chart format, of the control of the present invention.

The control of the present invention is illustrated in flow chart format in FIG. 4.

While the present invention is described with a certain degree of particularity, it is understood that various modifications are possible without departing from the spirit and scope of the invention as claimed.

I claim:

1. A method for controlling a friction clutch actuator assembly (27) operable to engage and disengage an associated friction clutch (20) having fully engaged and fully disengaged positions, said actuator assembly comprising a pneumatically operated piston (82) slidably and sealingly received in a cylinder, said piston movable relative to said piston in a first direction to cause disengagement of said clutch and in a second direction opposite said first direction to cause engagement of said clutch, first stop means (88) engageable to limit movement of said piston relative to said cylinder in said first direction and second stop means (90) engageable to limit movement of said piston relative to said cylinder in said second direction, said cylinder and piston defining at least one selectively pressurized and exhausted chamber (94), pressurization of said chamber effective to cause said piston to move relative to said cylinder in one of said directions and exhaust of said chamber effective to cause said piston to move relative to said cylinder in the other of said directions, valve means (78) for selectively pressurizing and exhausting said chamber, valve actuators for operating said valve means, a position sensor (76) for sensing the position of said piston relative to said cylinder, and a control unit (60) for receiving a plurality of input signals including a signal indicative of the position of said piston relative to said cylinder and for processing same according to predetermined logic rules to issue command output signals to actuators including said valve actuators, said method comprising:

(1) defining a predetermined offset distance (112) at which said piston may be separated from said first stop member (88) while continuing to cause said clutch to remain in the fully disengaged position thereof; and (2) when issuing command output signals to cause said clutch to be fully disengaged, causing said piston to move to and remain at an offset position (DOP) relative to said cylinder offset first stop member in said second direction by said offset distance.

2. The method of claim 1 wherein said piston is constantly biased in said second direction.

3. The method of claim 1 wherein said stop members are internal of said cylinder.

4. The method of claim 1 wherein step (2) comprises causing said piston to contact said first stop and then to move to and remain at said offset position.

5. The method of claim 1 further comprising (3) determining the axial position of said piston relative to said cylinder whereat said piston contacts said first stop member; and wherein step (2) comprises causing said piston to move directly to and remain at said offset position.

6. A method for controlling a friction clutch actuator assembly (27) operable to engage and disengage an associated friction clutch (20) having fully engaged and fully disengaged positions, said actuator assembly comprising a pneumatically operated piston (82) slidably and sealingly received in a cylinder, said piston movable relative to said piston in a first direction to cause disengagement of said clutch and in a second direction opposite said first direction to cause engagement of said clutch, first stop means (88) engageable to limit movement of said piston relative to said cylinder in said first direction and second stop means (90) engageable to limit movement of said piston relative to said cylinder in said second direction, said cylinder and piston defining at least one selectively pressurized and exhausted chamber (94), pressurization of said chamber effective to cause said piston to move relative to said cylinder in one of said directions and exhaust of said chamber effective to cause said piston to move relative to said cylinder in the other of said directions, valve means (78) for selectively pressurizing and exhausting said chamber, valve actuators for operating said valve means, a position sensor (76) for sensing the position of said piston relative to said cylinder, and a control unit (60) for receiving a plurality of input signals including a signal indicative of the position of said piston relative to said cylinder and for processing same according to predetermined logic rules to issue command output signals to actuators including said valve actuators, said method comprising:

(1) defining a predetermined offset distance (112) at which said piston may be separated from said second stop member (90) while continuing to cause said clutch to remain in the fully engaged position thereof; and (2) when issuing command output signals to cause said clutch to be fully engaged, causing said piston to move to and remain at an offset position (EOP) relative to said cylinder offset second stop member in said first direction by said offset distance.

7. The method of claim 6 wherein said piston is constantly biased in said second direction.

8. The method of claim 6 wherein said stop members are internal of said cylinder.

9. The method of claim 6 wherein step (2) comprises causing said piston to contact said second stop and then to move to and remain at said offset position.

10. The method of claim 6 further comprising (3) determining the axial position of said piston relative to said cylinder whereat said piston contacts said second stop member; and wherein step (2) comprises causing said piston to move directly to and remain at said offset position.

11. A system for controlling a friction clutch actuator assembly (27) operable to engage and disengage an associated friction clutch (20) having fully engaged and fully disengaged positions, said actuator assembly comprising a pneumatically operated piston (82) slidably and sealingly received in a cylinder, said piston movable relative to said piston in a first direction to cause disengagement of said clutch and in a second direction opposite said first direction to cause engagement of said clutch, first stop means (88) engageable to limit movement of said piston relative to said cylinder in said first direction and second stop means (90) engageable to limit movement of said piston relative to said cylinder in said second direction, said cylinder and piston defining at least one selectively pressurized and exhausted chamber (94), pressurization of said chamber effective to cause said piston to move relative to said cylinder in one of said directions and exhaust of said chamber effective to cause said piston to move relative to said cylinder in the other of said directions, valve means (78) for selectively pressurizing and exhausting said chamber, valve actuators for operating said valve means, a position sensor (76) for sensing the position of said piston relative to said cylinder, and a control unit (60) for receiving a plurality of input signals including a signal indicative of the position of said piston relative to said cylinder and for processing same according to predetermined logic rules to issue command output signals to actuators including said valve actuators, said system characterized by said logic rules including rules for:

(1) defining a predetermined offset distance (112) at which said piston may be separated from said first stop member (88) while continuing to cause said clutch to remain in the fully disengaged position thereof; and (2) when issuing command output signals to cause said clutch to be fully disengaged, causing said piston to move to and remain at an offset position (DOP) relative to said cylinder offset first stop member in said second direction by said offset distance.

12. The system of claim 11 wherein said piston is constantly biased in said second direction.

13. The system of claim 11 wherein said stop members are internal of said cylinder.

14. The system of claim 11 wherein the logic rules for step (2) comprise causing said piston to contact said first stop and then to move to and remain at said offset position.

15. The system of claim 11 further comprising logic rules for (3) determining the axial position of said piston relative to said cylinder whereat said piston contacts said first stop member; and wherein the logic rules for step (2) comprise causing said piston to move directly to and remain at said offset position.

16. A system for controlling a friction clutch actuator assembly (27) operable to engage and disengage an associated friction clutch (20) having fully engaged and fully disengaged positions, said actuator assembly comprising a pneumatically operated piston (82) slidably and sealingly received in a cylinder, said piston movable relative to said piston in a first direction to cause disengagement of said clutch and in a second direction opposite said first direction to cause engagement of said clutch, first stop means (88) engageable to limit movement of said piston relative to said cylinder in said first direction and second stop means (90) engageable to limit movement of said piston relative to said cylinder in said second direction, said cylinder and piston defining at least one selectively pressurized and exhausted chamber (94), pressurization of said chamber effective to cause said piston to move relative to said cylinder in one of said directions and exhaust of said chamber effective to cause said piston to move relative to said cylinder in the other of said directions, valve means (78) for selectively pressurizing and exhausting said chamber, valve actuators for operating said valve means, a position sensor (76) for sensing the position of said piston relative to said cylinder, and a control unit (60) for receiving a plurality of input signals including a signal indicative of the position of said piston relative to said cylinder and for processing same according to predetermined logic rules to issue command output signals to actuators including said valve actuators, said system characterized by said logic rules including rules for:

(1) defining a predetermined offset distance (112) at which said piston may be separated from said second stop member (90) while continuing to cause said clutch to remain in the fully engaged position thereof; and (2) when issuing command output signals to cause said clutch to be fully engaged, causing said piston to move to and remain at an offset position (EOP) relative to said cylinder offset second stop member in said first direction by said offset distance.

17. The system of claim 16 wherein said piston is constantly biased in said second direction.

18. The system of claim 16 wherein said stop members are internal of said cylinder.

19. The system of claim 16 wherein the logic rules for step (2) comprise causing said piston to contact said second stop and then to move to and remain at said offset position.

20. The system of claim 16 further comprising logic rules for (3) determining the axial position of said piston relative to said cylinder whereat said piston contacts said second stop member; and wherein the logic rules for step (2) comprise causing said piston to move directly to and remain at said offset position.

* * * * *